United States Patent
Bischoff et al.

(10) Patent No.: US 6,870,282 B1
(45) Date of Patent: Mar. 22, 2005

(54) METHOD FOR THE TRANSMISSION OF SIGNALS IN A BUS SYSTEM, SUPERPOSED ON A DIRECT SUPPLY VOLTAGE

(75) Inventors: Michael Bischoff, Hottenberg (DE);
Ruediger Deppe, Ingolstadt (DE);
Guenter Fendt, Schrobenhausen (DE);
Thomas Huber, Beilstein (DE);
Norbert Mueller, Schrobenhausen (DE); Werner Nitschke, Ditzingen (DE); Johannes Rinkens, Ingolstadt (DE); Peter Schaedler, Ludwigsburg (DE); Stefan Schaeffer, Ingolstadt (DE); Werner Steiner, Schrobenhausen (DE)

(73) Assignees: Conti Temic microelectronic GmbH, Nuremberg (DE); Robert Bosch GmbH, Stuttgart (DE)

( * ) Notice: Subject to any disclaimer, the term of this patent is extended or adjusted under 35 U.S.C. 154(b) by 207 days.

(21) Appl. No.: 10/111,156
(22) PCT Filed: Oct. 17, 2000
(86) PCT No.: PCT/EP00/10192
§ 371 (c)(1),
(2), (4) Date: Jul. 2, 2002
(87) PCT Pub. No.: WO01/30029
PCT Pub. Date: Apr. 26, 2001

(30) Foreign Application Priority Data
Oct. 21, 1999 (DE) .......................... 199 50 655

(51) Int. Cl.[7] .............................................. H01H 35/00
(52) U.S. Cl. ...................... 307/130; 174/100; 307/125; 307/147; 307/407; 307/56; 307/82; 307/58; 307/80

(58) Field of Search .......................... 174/100; 307/125, 307/147, 407, 56, 82, 58, 130, 80

(56) References Cited

U.S. PATENT DOCUMENTS

| | | |
|---|---|---|
| 4,463,341 A | 7/1984 | Iwasaki |
| 4,736,367 A | 4/1988 | Wroblewski et al. |
| 4,949,359 A | 8/1990 | Voillat |
| 5,552,986 A | 9/1996 | Omura et al. |

FOREIGN PATENT DOCUMENTS

| | | |
|---|---|---|
| DE | 3903377 | 8/1990 |
| DE | 19622685 | 9/1997 |
| DE | 4411184 | 6/1998 |
| DE | 19813955 | 9/1999 |

*Primary Examiner*—Dean A. Reichard
*Assistant Examiner*—Jinhee Lee
(74) *Attorney, Agent, or Firm*—W. F. Fasse; W. G. Fasse

(57) ABSTRACT

Previously in a bus system, voltage signals were transmitted from the central unit to the modules, which could reply thereto by variation of the current input. A disadvantage thereby is the relatively high susceptibility to interference of the current input, which itself already must be kept relatively small due to the energy consumption, as well as the correspondingly high effort and expense for an error-free recognition of the signals transmitted from the modules in the central unit. It is now suggested, that the modules also answer to the central unit by means of voltage signals superposed on the direct supply voltage, whereby for the time duration of the signal transmission by the modules, the central unit provides the direct supply voltage to the bus line over a resistor, so that the voltage signal of the module can be detected in the central unit on the bus line on the side of the resistor facing away from the direct supply voltage. A preferred application for bus systems in motor vehicles, especially for a sensor data bus, is provided.

13 Claims, 3 Drawing Sheets

METHOD FOR THE TRANSMISSION OF SIGNALS IN A BUS SYSTEM, SUPERPOSED ON A DIRECT SUPPLY VOLTAGE

FIELD OF THE INVENTION

The invention relates to a method for the transmission of signals in a bus system between a central unit and a number of modules, wherein the signals are superposed on a direct supply voltage provided by the central unit onto at least one bus line. Thereby, the signal is additively supplemented to the direct supply voltage, i.e. superposed thereon, or the direct supply voltage is correspondingly modulated.

BACKGROUND INFORMATION

A method can be seen in the DE 196 22 685 A1, in which signals are exchanged between an evaluating unit serving as a central unit and an ignition device as a module. For the transmission of these signals from the evaluating unit to the ignition device, an alternating voltage signal is generated, which is superposed on a direct voltage that serves for the voltage supply. For replies from the ignition device, its current input is varied in a targeted manner (see col. 6, beginning at line 25 and claims 6 to 9 of the DE 196 22 685 A1). A disadvantage of this arrangement is that only exactly one module can exchange signals with the central unit. Moreover, a corresponding method for the bi-directional data transmission can already also be seen from the DE 39 03 377 A1. Also therein, only exactly one module embodied as a counter can be coupled to the central unit embodied as a read-write device. The quiescent or resting current of the module must lie within a tightly limited prescribed magnitude range in order to be able to receive the current-modulated return signals.

Moreover, in the DE 44 11 184, there is described a motor vehicle safety system with a time-alternating energy and data transmission on a bus line.

A method for the signal transmission between a plurality of modules by superposition of an alternating signal on a direct voltage or a corresponding modulation thereof, can be seen in the U.S. Pat. No. 4,463,341 for example, in which a plurality of transmitters and receivers is arranged in a bus system, which use the direct voltage on the bus system for the voltage supply and superpose frequency modulated alternating voltage signals thereon, whereby respectively one transmitter and one receiver are calibrated to a common transmission frequency. Such a bus system could be readily transferred to the signal transmission with a central unit and several modules, in that the central unit would use alternating voltage signals with the respective transmission frequency. This, however, just like the U.S. Patent, would result in the disadvantage that an extremely high accuracy of the frequencies is required for the demodulation. The expense and effort required for such a bus system is considerable.

A bus system can be seen in the U.S. Pat. No. 4,736,367, wherein similarly a plurality of modules are supplied with voltage from a microcomputer over a bus line, and data are transmitted to the modules by superposed voltage signals, and furthermore, the modules transmit data back to the microcomputer by variation of their current input. For that purpose, a controllable current sink with a constant current source is provided respectively in the modules, so that each module can achieve a current input determined by the constant current source. Thereby, the differentiation of the data of the individual modules is achieved by a serial transmission in prescribed time windows, to which the modules are allocated by addresses. Due to the varying current input, a voltage signal arises at the microcomputer, which voltage signal is evaluated by means of a threshold value. In this context, it is found to be problematic that on the one hand the direct supply voltage and on the other hand the current input through the modules is known and constant for the recognition of the current modulated signals of the modules. For example, if modules with a different current input were to be used, then a comparison with the threshold value would be impossible. The addition of several new modules would also lead to errors, because, due to the current input of the added modules, it would similarly lead to a shifting of the total current input. If one further considers the fluctuations of the supply voltage in the usually battery-supplied bus systems in motor vehicles, as well as the temperature influences on the electrical components, it becomes clear that a great number of interfering values interfere with the signal transmission and can make a return recognition of the signal impossible.

SUMMARY OF THE INVENTION

It is the object of the invention to provide an alternative method for the signal transmission between a central unit and a number of modules, superposed on a direct supply voltage, in which the number of the modules is selectable, which is easily carried out in terms of the circuit technology, and which is insensitive with respect to interferences or variations.

The above object has been achieved according to the invention in a method for signal transmission in a bus system between a central unit and a number of modules, a) in which the central unit comprises first and second voltage sources for respective different first and second voltage levels, which are connected respectively through a switch with a bus line, whereby a resistor is connected parallel to one of the switches, b) in which a first voltage signal is transmitted by the central unit to at least one receiving module among the modules, superposed on a direct supply voltage provided by the central unit onto the bus line, and c) at least one transmitting module among the modules transmits a second voltage signal, d) whereby the central unit and the at least one transmitting module transmit in a time-offset manner, and e) during the reception of the second voltage signal the central unit supplies the direct supply voltage onto the bus line over the interposed resistor, and f) in the central unit, the second voltage signal caused by the at least one transmitting module is detected on the bus line on the side of the resistor facing away from the direct supply voltage, g) each one of the modules comprises a control electronics, a receiver device and a transmitter device, h) the transmitter device pulls the bus line to a third voltage level deviating from the direct supply voltage dependent on the control electronics, by means of a switch, which is arranged between the bus line and a third voltage level source that generates the third voltage level.

The basic idea of the invention is that it becomes possible to transmit a voltage signal superposed on the direct supply voltage from the modules to the central unit or alternatively also to another module, if, for the time duration of the transmitting by the modules, this direct supply voltage is supplied not directly, but rather over a resistor, to the bus line, and thereby the modules can vary the voltage existing on the bus line corresponding to the voltage signal to be transmitted.

When the central unit itself transmits, two voltage levels that serve for the signaling are switched in, quickly and in a low impedance and hard manner, preferably directly via two alternately closed switches, in other words the voltage is imposed on the supply line due to the low internal resistance of the switch.

If, however, the modules are to transmit, then during this time duration of the return transmission, the central unit will thus comprise a higher internal resistance for the supplied direct supply voltage via the interposed resistor, so that the voltage on the bus line can be varied due to the supply of the voltage signal that is to be transmitted by the module, which is of low impedance in comparison to this resistor. Thus, the direct supply voltage is present with a higher impedance, that is to say the direct supply voltage is soft and variable. In the following, these two cases will also be discussed in terms of a hard level on the connecting line due to its being fixed or prescribed in a low impedance manner, or a soft level on the connecting line due to its being influenceable, depending on the influenceability of the voltage of the modules on the bus line by means of the interposition of the resistor. In an analogous manner, the terms hard internal resistance and soft internal resistance of the central unit will also be used.

In contrast to a signaling of the modules by current signals, which naturally also bring about a certain voltage variation on the bus line in a known manner corresponding to Ohm's Law, by means of the two-sided voltage signal transmission, a considerably higher signal level range or swing can be achieved, and therewith an improved interference immunity or safety against interference can be achieved. Additionally, the generation of the voltage signal in the modules is passive, because the direct supply voltage that is applied over the interposed resistor in a soft manner, thus in a variable manner, is utilized, and is only varied for the actual bit information, preferably being reduced by being switched to a deviating voltage level source.

Thus, the modules do not require their own transmitting power, but rather only the energy necessary for the control electronics and the following or downstream-connected power consumers, for example sensors.

In an advantageous manner, the voltage signals are pulse-width modulated, whereby the clock signal generation is carried out in a hard manner, that is to say with a low internal resistance, through the central unit. The component of the voltage signal carrying the bit information is subsequently generated in the central unit or in the modules, deviating from one another depending on the direction of the transmission, according to the basic underlying method. Correspondingly, either a hard or a soft internal resistance respectively exists in the central unit.

The claimed embodiments of the circuit arrangement for carrying out the method clearly set forth the extremely simple circuit technological realization of this method.

In a particular manner, the described method as well as the circuit arrangement are suitable for use as a sensor bus system of an occupant or passenger protection system especially in motor vehicles. In that context, sensors are connected to the individual modules, whereby these sensors, for example, also detect the spacing distances relative to objects in the vehicle environment (spacing distance warning radar), the position of the occupants (seat occupancy recognition) or condition parameters of the motor vehicle, such as the speed, in addition to the acceleration forces acting on the vehicle.

In this manner, various different sensors are connected via the modules to a common bus system and are thus connected with the central unit. The central unit coordinates the entire energy and signal transmission by means of the interposed connection of the resistor and naturally by the data transmitted to the modules, which data are evaluated in the control electronics at those modules.

BRIEF DESCRIPTION OF THE DRAWINGS

In the following, the invention shall be explained in greater detail in connection with example embodiments and drawing figures. It is shown by.

DETAILED DESCRIPTION OF PREFERRED EXAMPLE EMBODIMENTS AND OF THE BEST MODE OF THE INVENTION

Figure 1:
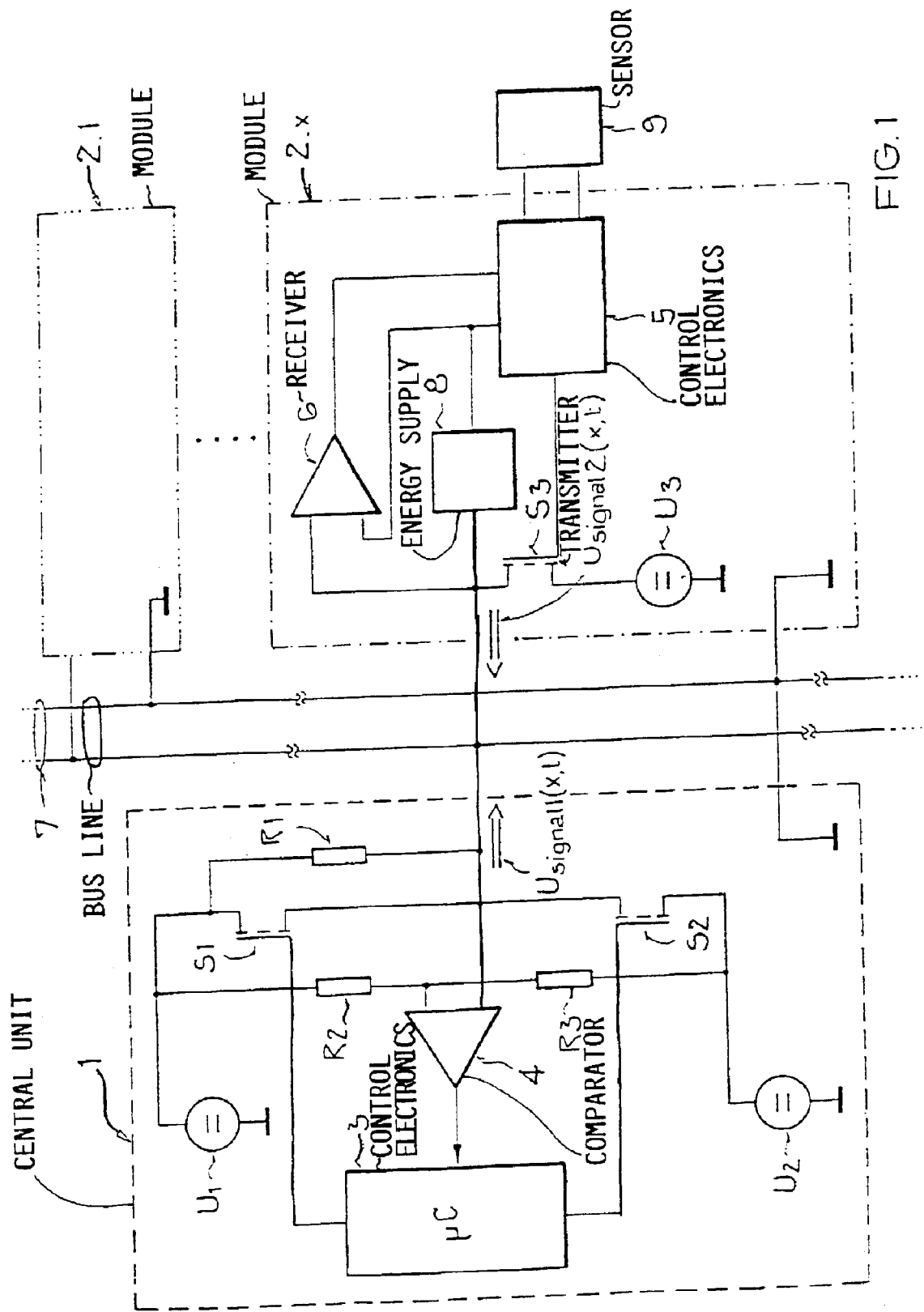
FIG. 1 circuit arrangement for carrying out the method with a central unit and a number of modules connected therewith via bus line, of which one module is shown in detail.

The FIG. 1 shows a circuit arrangement for carrying out the method with a bus system with a central unit 1 and a number of modules 2.1 to 2.n connected therewith via a bus line 7. For better clarity and comprehension, only the $x^{th}$ module 2.x of the modules 2.1 to 2.n is shown in detail, whereby the others are of course basically identically constructed, but generally comprise other downstream connected load elements, for example sensors 9.

The central unit 1 consists of a control electronics 3, for example a microcontroller, which carries out the control of the central unit 1 and therewith also the data transmission onto the bus line 7. Two voltage level sources U1 and U2 are provided for the similarly named voltage levels U1 and U2 being used, whereby one of these, and typically the larger one of the two and in this example U1, is used as the direct supply voltage. The second voltage level U2 could also be the ground potential, but an at least slightly higher potential is preferred, however, because by means of this it is also possible to recognize short-circuits of the bus line 7 to ground. Respectively one of these voltage levels U1, U2 is alternately connected via respectively a switch S1, S2 with the bus line. Moreover, a high impedance resistor R1 is connected in circuit parallel to the first switch S1, so that when switch S2 is closed, the voltage on the bus line 7 will take on the voltage level U2 without any significant deviation, and on the other hand, with open switches S1 and S2, the voltage level U1 will be applied via this resistor R1 in a soft manner, i.e. in a variable manner.

On the side of the resistor facing away from the direct supply voltage U1, that is to say on the bus line, the voltage is picked-up or tapped by a comparator 4 and compared with a voltage threshold, which is generated in an especially simple embodiment by means of a voltage divider with the resistors R2 and R3 from the difference of the first and second voltage levels U1, U2.

In this example embodiment, the bus line 7 is still supplemented by a second line carrying the ground potential. In this example embodiment, n modules 2.1 . . . 2.x . . . 2.n are connected in parallel to the bus line 7 as well as the ground line. The module 2.x, which is shown in detail as an example for the other modules, comprises, just like each one of the modules 2, a control electronics 5, a receiver device 6, a transmitter device S3, and an energy supply device 8.

The receiver device 6 detects the voltage signals (Usignal1(x;t); (Usignal2(x;t)) that are transmitted on the bus line 7, and provides these in a prepared or pre-processed form to the control electronics 5. Thus, in the receiver device 6, which is also shown as a comparator for this reason, the voltage on the bus line 7 is compared with a reference voltage, which is internally generated in the modules, for example by the energy supply device 8. The reference voltage may, for example, also be used as an internal supply voltage, whereby the energy supply device 8 obtains the energy for the module 2 from at least one of the voltage potentials, here in this example embodiment U1, so that in other words, it stabilizes and intermediately stores the voltage. The stabilizing and intermediate storing in the energy supply device 8 is necessary in that context, because the voltage on the supply line 7 will, of course, be constantly varied by the superposed voltage signals (Usignal1(x;t); Usignal2(x;t)).

The control electronics 5 coordinate all process sequences in the module 2 dependent on the control information of the central unit 1, and activates the transmitting device S3, especially as the case may be, when exactly this module 2.x is permitted and/or called upon to transmit. Thereby, the module 2.x can transmit to the central unit 1 as well as to the other modules 2.1 . . . , 2.(x−1), as well as 2.(x+1) . . . 2.n connected to the bus line. Of course, the other modules or the central unit can also receive the data exchange of the others. The so-called data layer, in other words the coding of addresses and complete control commands (for example the programming of commands of the central unit to the modules, the reading-out of sensor data, etc.) in a sequence of individual bits, can thereby be adapted to the requirements of the individual case in a completely free manner, and will not be described here in further detail.

The transmitting device of the module 2 in this example embodiment is especially simply embodied as a switch S3, which is arranged between the bus line 7 and a third voltage level source U3, which comprises at least a value that deviates or differs from the direct supply voltage, i.e. here U1, and preferably corresponds to the second voltage level U2. Dependent on the control electronics 5, this switch S3 is switched on during the soft internal resistance (both switches S1 and S2 of the central unit 1 are open) dependent on the bit information that is to be transmitted. For example, for a bit with the value "0" the switch S3 is switched on, while for a "1" the switch S3 remains open. When the switch S3 is closed, then the voltage level source U3 will be applied to the bus line 7 with a significantly lower impedance than the direct supply voltage U1, which is, of course, applied over the resistor R1. As a result, the voltage on the bus line 7 will take on at least approximately the value of U3. The level of the voltage on the bus line is thus determined by the voltage divider made up of R1 and the internal resistance of the switch S3. The receiver device 4 of the central unit 1 as well as those of the other modules can, however, be adapted by means of the there-existing reference value, in other words for the central unit, for example, via R2 and R3, so that the value of the resistor R1 is selectable within wide limits and the circuit arrangement is correspondingly adaptable.

Figure 2:
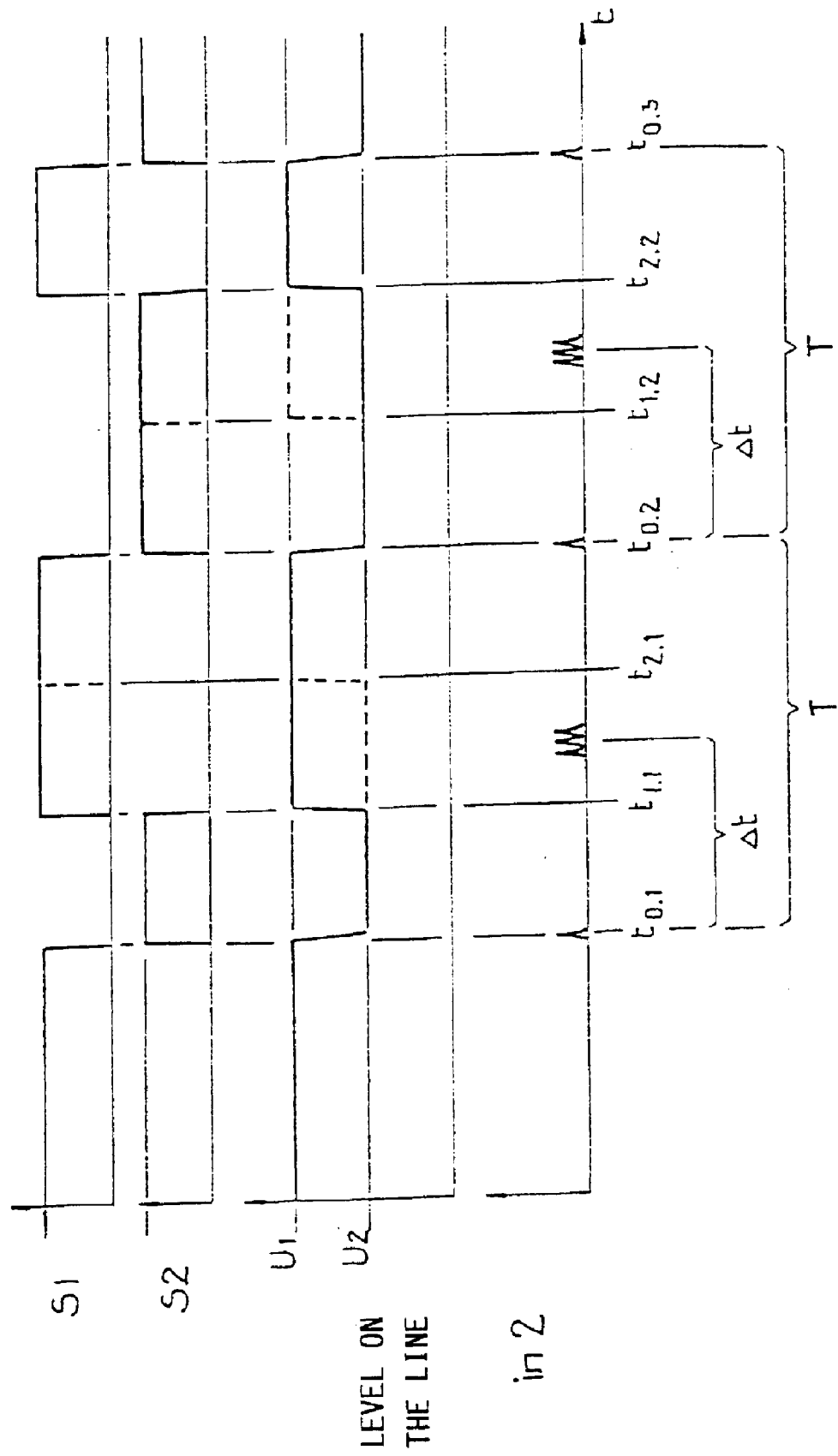
FIG. 2 the sequence or progression of a data transmission from the central unit to the module.
Figure 3:
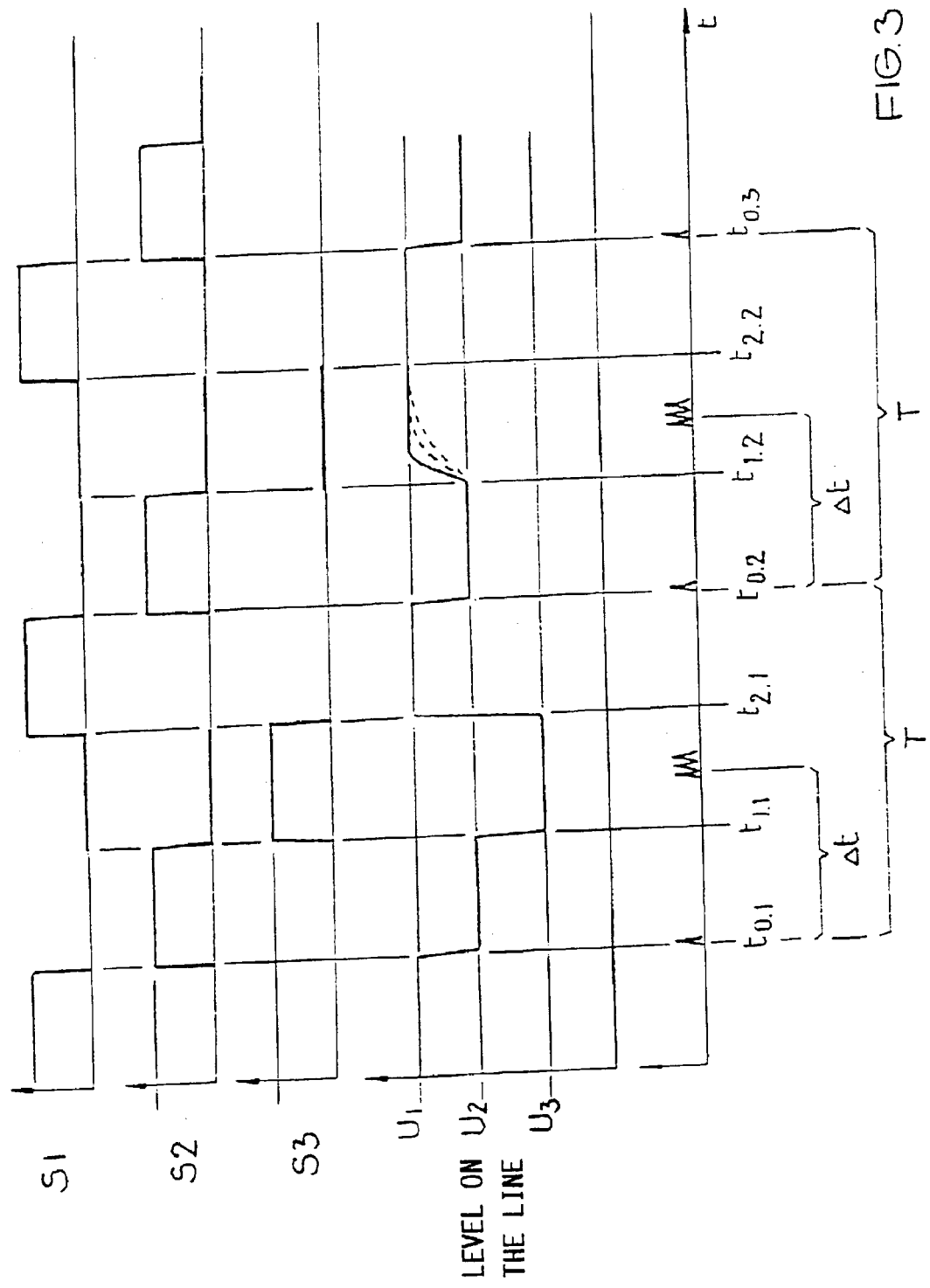
FIG. 3 the sequence or progression of a data transmission beginning from one of the modules to the central unit or a different module.

In connection with the switching conditions of S1 and S2, as well as the level on the bus line and a symbolic clocking schematic of the module, FIG. 2 now shows the sequence or progression of a data transmission from the central unit 1 to the module 2, and FIG. 3 shows the sequence or progression of a data transmission beginning from one of the modules 2 to the central unit 1 or a different module 2, whereby respectively the transmission of a bit information 0 and 1 is illustrated in a pulse width modulated manner, as an example.

In FIG. 2, as a further example, a falling signal flank serving as a clock signal is generated for a longer transmission pause by alternate opening of S1 and closing of S2 at the time point t0.1, whereby this falling flank causes a change from the first voltage level U1 serving as the direct supply voltage to U2 on the bus line 7 and therewith at the modules 2. Thereby the clock signal is recognized by the modules 2, as indicated in a schematic manner.

After a certain holding time of U2, the actual bit information is transmitted in a pulse width modulated manner, in that the first voltage level U1 is once again taken on, in a time duration or interval from t1 to t2 from the clock signal t0, whereby this time interval is dependent on the bit information. Thus, in this context, for example, for a "1" the level on the line will switch to U1 already at the beginning, i.e. at t1.1, while in the subsequent second clock signal, indicated as index 2, for a 0 the level will only be switched over to U1 at the time point t2.2, respectively in a hard manner, i.e. without interposing the resistor R1. In a predetermined spacing or interval Δt relative to the clock signal beginning t0.1, t0.2, . . . , the evaluation of the voltage on the bus line will be carried out in the modules 2, for example here it has been schematically indicated as a multiple sampling. Thereby, the switch S3 of the module 2 is, of course, open.

The transmission from beginning from one of the modules 2 will now be shown in FIG. 3, whereby in this case for the sake of better illustration, a third voltage level U3 deviating from U2 will be taken-on, since one immediately recognizes a change or variation in this case for both binary values "0" and "1". In this preferred embodiment, the clock signal generation is carried out again at first from the central unit 1 in the same manner, namely through alternate switching of S1 and S2 and thereby a falling flank from U1 to U2 at t0.1, t0.2, . . .

At time point t1.1, t1.2, . . . however, the central unit 1 switches or alternates into the phase of the soft internal resistance, by opening both switches, i.e. S1 and S2. Now, the supply voltage U1 will only be applied to the bus line over the resistance R1. When, however, at t1.1, the module 2.x selected for transmitting closes the switches S3, the voltage on the supply or bus line 7 will fall to U3. If instead S3 also stays open, then the level on the bus line 7 will again take on the value of the direct supply voltage U1 dependent on the value or magnitude of the resistor R1. The central unit 1 as well as possibly also the other modules 2 detect the level on the bus line 7 between t1 and t2, whereby this level in the present case is either U1 or U3, or when U3=U2 then either U1 or U2. Once again, the detection of the voltage signal is indicated in FIG. 3 by multiple sampling at time Δt after the respective clock signal at t0.1, t0.2, . . .

Finally, it is a basic point for the sequence or progression of the method to provide the direct supply voltage U1 in a soft manner, that is to say in a high impedance manner over the interposed resistor R1, and therewith it becomes possible to transmit a voltage signal from the modules 2 on the connecting bus line 7, especially to the central unit 1.

What is claimed is:

1. Method for signal transmission in a bus system between a central unit (1) and a plurality of modules, a) in which the central unit (1) comprises first and second voltage sources for respective different first and second voltage levels (U1, U2), which are connected respectively through a switch (S1, S2) with a bus line (7), whereby a resistor (R1) is connected parallel to one of the switches (S1), b) in which a first voltage signal (Usignal1(x;t)) is transmitted by the central unit (1) to at least one receiving module among the modules (2) superposed on a direct supply voltage U1(t) provided by the central unit (1) onto the bus line (7), and c) at least one transmitting module among the modules (2) transmits a second voltage signal (Usignal2(x;t)), d) whereby the central unit (1) and the at least one transmitting module (2) transmit in a time-offset manner, and e) during the reception of the second voltage signal (Usignal2(x;t)) the central unit supplies the direct supply voltage U1(t) onto the bus line (7) over the interposed resistor (R1), and f) in the central unit, the second voltage signal (Usignal2(x;t)) caused by the at least one transmitting module (2) is detected on the bus line (7) on the side of the resistor (R1) facing away from the direct supply voltage U1(t), g) each one of the modules (2) comprises a control electronics (5), a receiver device (6) and a transmitter device (S3), h) the transmitter device (S3) pulls the bus line (7) to a third voltage level deviating from the direct supply voltage U1(t) dependent on the control electronics (5), by means of a switch (S3), which is arranged between the bus line (7) and a third voltage level source (U3) that generates the third voltage level.

2. Method according to claim 1, characterized in that the voltage level generated by the third voltage level source (U3) corresponds to the second voltage level (U2).

3. Method according to claim 1, characterized in that the voltage signals (Usignal1(x;t); (Usignal2(x;t)) are bitwise pulse width modulated, in that a) first the central unit (1), for generating a clock signal (t0), switches from the first voltage level (U1) to the second voltage level (U2) for each bit without interposition of the resistor, b) for the transmission from the central unit (1) to the at least one receiving module (2), during a time interval (t1–t2) from the clock signal (t0) which is dependent on a first bit information, the central unit (1) will again take on the first voltage level (U1), once again without interposition of the resistor (R1), while c) for the transmission from the at least one transmitting module (2), after the generation of the clock signal (t0), for a prescribed time duration, the central unit (1) supplies the first voltage level to the bus line (7) via the resistor (R1), and within this time duration, the respective module (2) pulls the bus line (7) to the third voltage level, dependent on a second bit information.

4. Method according to claim 3, wherein the third voltage level corresponds to the second voltage level.

5. Circuit arrangement for carrying out the method according to claim 1, whereby the respective transmitter device (S3) of each one of the modules comprises a switch (S3) which is arranged between the bus line (7) and the third voltage level source (U3).

6. Circuit arrangement according to claim 5, characterized in that each one of the modules comprises an energy supply device (8), and the respective energy supply device (8) obtains energy for the respective module (2) from at least one of the voltage levels (U1).

7. Use of the method according to claim 1, for a sensor bus system of an occupant protection system, especially for motor vehicles, in which sensors (9) that are relevant for the occupant protection are read-out by the central unit (1) via the modules (2), and a triggering decision for occupant protection devices that are similarly connected with the central unit (1) is derived.

8. A method for transmitting voltage signals in a bus system including a central unit, a module, and a bus line connected to said central unit and to said module, wherein said central unit includes a first voltage source providing a first voltage level, a second voltage source providing a second voltage level different from said first voltage level, a first switch connected between said first voltage source and said bus line, a second switch connected between said second voltage source and said bus line, and a resistor connected parallel to said first switch between said first voltage source and said bus line, wherein said module includes a control electronics, a receiver device connected to said bus line, a transmitter device that includes a third switch and is connected to said bus line, and a third voltage source providing a third voltage level, wherein said third switch is connected between said third voltage source and said bus line, wherein said method comprises the steps:

a) said central unit applies a direct supply voltage onto said bus line through said resistor from said first voltage source;

b) said central unit transmits onto said bus line a first voltage signal superposed on said direct supply voltage by controlling said first and second switches to alternately connect said first and second voltage sources respectively through said first and second switches to said bus line;

c) at a time separate from said step b) and while said central unit applies said direct supply voltage onto said bus line, said module transmits onto said bus line a second voltage signal superposed on said direct supply voltage by controlling said third switch with said control electronics to selectively pull said bus line through said third switch to said third voltage level which deviates from said direct supply voltage; and d) during said step c), said central unit detects said second voltage signal on a side of said resistor oriented away from said first voltage source.

9. The method according to claim 8, wherein said third voltage level corresponds to said second voltage level.

10. The method according to claim 8, wherein:

said first voltage signal includes a first succession of bits that are each pulse width modulated;

said second voltage signal includes a second succession of bits that are each pulse width modulated;

said steps b) and c) further comprise said central unit generating a respective clock signal for each one of said bits, by controlling said first and second switches to switch from a first condition in which said first switch is conductive and said second switch is non-conductive, to a second condition in which said first switch is non-conductive and said second switch is conductive;

said step b) further comprises, for a respective bit of said first succession of bits, controlling said first and second switches so that said first switch is conductive and said second switch is non-conductive during a first time interval following said clock signal dependent on a first bit information of said respective bit of said first succession of bits;

said step c) further comprises, for a respective bit of said second succession of bits, controlling said first and second switches so that said first and second switches are both non-conductive and said first voltage source is connected through said resistor to said bus line for a prescribed time duration following said clock signal, and within said time duration controlling said third switch to selectively pull said bus line through said third switch to said third voltage level selectively dependent on a second bit information of said respective bit of said second succession of bits.

11. A circuit arrangement to carry out the method according to claim 8, wherein said circuit arrangement comprises said bus system including said central unit, said module, and said bus line connected to said central unit and to said module;

wherein said central unit includes said first voltage source providing said first voltage level, said second voltage source providing said second voltage level different from said first voltage level, said first switch connected between said first voltage source and said bus line, said second switch connected between said second voltage source and said bus line, and said resistor connected parallel to said first switch between said first voltage source and said bus line, wherein said module includes said control electronics, said receiver device connected to said bus line, said transmitter device that includes said third switch and is connected to said bus line, and said third voltage source providing said third voltage level, wherein said third switch is connected between said third voltage source and said bus line.

12. The circuit arrangement according to claim 11, wherein said module further comprises an energy supply device that obtains energy for said module from one of said first and second voltage sources via said bus line.

13. The circuit arrangement according to claim 11, for an occupant protection system in a motor vehicle, further comprising a sensor that is connected to said module and that is adapted to sense a parameter relevant to an occupant protection function, and an occupant protection device connected via said bus line to said central unit.

* * * * *

UNITED STATES PATENT AND TRADEMARK OFFICE
CERTIFICATE OF CORRECTION

PATENT NO.    : 6,870,282 B1
DATED         : March 22, 2005
INVENTOR(S)   : Bischoff et al.

It is certified that error appears in the above-identified patent and that said Letters Patent is hereby corrected as shown below:

Title page,
Item [57], ABSTRACT, delete and replace the ABSTRACT to read as follows:
-- In a bus system, voltage signals are transmitted from a central unit to modules connected to a bus line by selectively applying first and second voltage levels to the bus line. The modules reply thereto also by voltage signals superposed on a direct supply voltage on the bus line by selectively pulling the bus line to a third voltage level. For the time duration of the signal transmission by one of the modules, the central unit provides the direct supply voltage to the bus line through a resistor, so that the voltage signal of the module on the bus line can be detected in the central unit on the side of the resistor facing away from the source of the direct supply voltage. A preferred application is for bus systems in motor vehicles, especially for a sensor data bus. --;

Column 5,
Line 22, after "electronics 5", replace "coordinate" by -- coordinates --;

Column 6,
Line 32, after "transmission", delete "from";
Line 37, after "and "1"." start a new paragraph;
Line 47, after "over the", replace "resistance" by -- resistor --;
Line 58, after "t0.2", delete ",";

Column 8,
Line 11, after "method", replace "for" by -- of --.

Signed and Sealed this

Eleventh Day of October, 2005

JON W. DUDAS
*Director of the United States Patent and Trademark Office*